United States Patent
Linsky et al.

(10) Patent No.: US 10,412,565 B2
(45) Date of Patent: Sep. 10, 2019

(54) SYSTEMS AND METHODS FOR MUTING A WIRELESS COMMUNICATION DEVICE

(71) Applicant: QUALCOMM Incorporated, San Diego, CA (US)

(72) Inventors: Joel Benjamin Linsky, San Diego, CA (US); Robin Heydon, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/384,045

(22) Filed: Dec. 19, 2016

(65) Prior Publication Data

US 2018/0176713 A1 Jun. 21, 2018

(51) Int. Cl.
*H04W 4/80* (2018.01)
*H04M 1/60* (2006.01)
*H04W 76/14* (2018.01)

(52) U.S. Cl.
CPC ........... *H04W 4/80* (2018.02); *H04M 1/6008* (2013.01); *H04M 1/6033* (2013.01); *H04M 1/6066* (2013.01); *H04W 76/14* (2018.02); *H04M 2250/02* (2013.01)

(58) Field of Classification Search
CPC .......................... H04M 1/6033; H04W 76/023
See application file for complete search history.

(56) References Cited

U.S. PATENT DOCUMENTS

| | | | | |
|---|---|---|---|---|
| 7,257,398 B1 * | 8/2007 | Ukita | .................. | H04M 1/6066 348/14.05 |
| 7,599,661 B2 * | 10/2009 | Amtmann | .......... | G06K 19/0723 340/10.1 |
| 8,006,002 B2 | 8/2011 | Kalayjian et al. | | |
| 8,068,882 B2 * | 11/2011 | Davis | .................... | G06F 1/1632 381/300 |
| 8,214,447 B2 | 7/2012 | Deslippe et al. | | |
| 8,560,023 B2 | 10/2013 | Luzzatto | | |
| 8,903,721 B1 * | 12/2014 | Cowan | ................... | H04R 3/005 704/206 |
| 9,031,838 B1 * | 5/2015 | Nash | ....................... | G10L 25/69 704/200 |
| 2005/0105717 A1 * | 5/2005 | Lawrie | ................... | H03G 7/007 379/388.01 |
| 2008/0146290 A1 | 6/2008 | Sreeram et al. | | |
| 2009/0053997 A1 * | 2/2009 | Jobling | ..................... | G06F 3/01 455/41.2 |

(Continued)

FOREIGN PATENT DOCUMENTS

EP 1463246 A1 9/2004

OTHER PUBLICATIONS

International Search Report and Written Opinion—PCT/US2017/058459—ISA/EPO—dated Jan. 4, 2018.

*Primary Examiner* — David Bilodeau
(74) *Attorney, Agent, or Firm* — Austin Rapp

(57) ABSTRACT

A method for muting a Bluetooth device is described. The method includes receiving, by a Bluetooth controller of the Bluetooth device, a mute remote microphone message from a peer Bluetooth device. The method also includes disabling audio transmission functionality of the Bluetooth device. The Bluetooth device may also receive a disable remote mute message from the peer Bluetooth device and enable the audio transmission functionality of the Bluetooth device.

18 Claims, 7 Drawing Sheets

(56) References Cited

U.S. PATENT DOCUMENTS

| | | | |
|---|---|---|---|
| 2010/0040240 A1* | 2/2010 | Bonanno | A63F 13/02 |
| | | | 381/74 |
| 2011/0143664 A1 | 6/2011 | Fuccello et al. | |
| 2011/0306393 A1 | 12/2011 | Goldman et al. | |
| 2013/0114832 A1* | 5/2013 | Lozano | H03G 3/348 |
| | | | 381/104 |
| 2014/0170979 A1 | 6/2014 | Samanta Singhar | |
| 2014/0274004 A1* | 9/2014 | Koll | H04M 1/6033 |
| | | | 455/416 |
| 2016/0057264 A1* | 2/2016 | Felton | H04W 4/008 |
| | | | 455/41.2 |

* cited by examiner

SYSTEMS AND METHODS FOR MUTING A WIRELESS COMMUNICATION DEVICE

TECHNICAL FIELD

The present disclosure relates generally to wireless communications. More specifically, the present disclosure relates to systems and methods for muting a wireless communication device.

BACKGROUND

In the last several decades, the use of wireless communication devices has become common. In particular, advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions and/or that perform functions faster, more efficiently or more reliably are often sought after.

Advances in technology have resulted in smaller and more powerful wireless communication devices. For example, there currently exists a variety of wireless communication devices such as portable wireless telephones (e.g., smartphones), personal digital assistants (PDAs), laptop computers, tablet computers and paging devices that are each small, lightweight and can be easily carried by users.

A wireless communication device may make use of one or more wireless communication technologies. For example, a wireless communication device may communicate using Bluetooth technology. A Bluetooth device may send and receive audio data to other Bluetooth devices. For example, a remote Bluetooth headset may receive an audio stream from a handset. The remote Bluetooth headset may also send audio signals back to the handset.

In some cases, mute may be enabled at a peer Bluetooth device to disable audio transmission functionality. However, a remote Bluetooth device may be unaware of this mute state and may continue to transmit audio data to the peer Bluetooth device. As seen by this discussion, muting of a remote Bluetooth device by a peer Bluetooth device may be beneficial.

SUMMARY

A method for muting a Bluetooth device is described. The method includes receiving, by a Bluetooth controller, a mute remote microphone message from a peer Bluetooth device. The method also includes disabling audio transmission functionality of the Bluetooth device.

The Bluetooth device may be a headset, headphones or automobile hands-free audio system.

The method may also include receiving a disable remote mute message from the peer Bluetooth device. The method may further include enabling the audio transmission functionality of the Bluetooth device.

The method may also include generating, at the Bluetooth controller, a mute local microphone message in response to receiving the mute remote microphone message. The method may further include sending the mute local microphone message from the Bluetooth controller to a host of the Bluetooth device. The host disables the audio transmission functionality in response to the mute local microphone message.

The mute remote microphone message may be communicated from the peer Bluetooth device to the Bluetooth device via one of a link layer control procedure, link manager protocol or Qualcomm link layer (QLL) procedure.

Disabling audio transmission functionality of the Bluetooth device may include disabling microphone path codec processing of the Bluetooth device. Disabling audio transmission functionality of the Bluetooth device may include disabling voice activity detection. Disabling audio transmission functionality of the Bluetooth device may include disabling audio-related wireless transmissions from the Bluetooth device to the peer Bluetooth device.

The Bluetooth device may receive the mute remote microphone message from the peer Bluetooth device when mute is enabled at a user interface of the peer Bluetooth device.

A Bluetooth device is also described. The Bluetooth device includes a processor, a memory in communication with the processor and instructions stored in the memory. The instructions are executable by the processor to receive, by a Bluetooth controller, a mute remote microphone message from a peer Bluetooth device. The instructions are also executable to disable audio transmission functionality of the Bluetooth device.

A computer-program product is also described. The computer-program product includes a non-transitory computer-readable medium having instructions thereon. The instructions include code for causing a Bluetooth device to receive, by a Bluetooth controller, a mute remote microphone message from a peer Bluetooth device. The instructions also include code for causing the Bluetooth device to disable audio transmission functionality of the Bluetooth device.

An apparatus is also described. The apparatus includes means for receiving, by a Bluetooth controller, a mute remote microphone message from a peer Bluetooth device. The apparatus also includes means for disabling audio transmission functionality of the Bluetooth device.

A method for muting a remote Bluetooth device by a peer Bluetooth device is also described. The method includes detecting that mute is enabled at the peer Bluetooth device. The method also includes generating a mute remote microphone message to disable audio transmission functionality of the remote Bluetooth device. The method further includes sending, by a Bluetooth controller of the peer Bluetooth device, the mute remote microphone message to the remote Bluetooth device.

The remote Bluetooth device may be a headset, headphones or automobile hands-free audio system.

The method may also include detecting that mute is disabled at the user interface of the peer Bluetooth device. The method may further include generating a disable remote mute message. The method may additionally include sending, by the Bluetooth controller of the peer Bluetooth device, the disable remote mute message to the remote Bluetooth device.

The mute remote microphone message may be communicated from the peer Bluetooth device to the remote Bluetooth device via one of a link layer control procedure, link manager protocol or Qualcomm link layer (QLL) procedure.

The remote Bluetooth device may disable microphone path codec processing upon receiving the mute remote microphone message. The remote Bluetooth device may disable voice activity detection upon receiving the mute remote microphone message. The remote Bluetooth device may disable audio-related wireless transmissions to the peer Bluetooth device upon receiving the mute remote microphone message.

A peer Bluetooth device is also described. The peer Bluetooth device includes a processor, a memory in communication with the processor and instructions stored in the memory. The instructions are executable by the processor to detect that mute is enabled at the peer Bluetooth device. The instructions are also executable to generate a mute remote microphone message to disable audio transmission functionality of the Bluetooth device. The instructions are further executable to send, by a Bluetooth controller of the peer Bluetooth device, the mute remote microphone message to the remote Bluetooth device.

A computer-program product is also described. The computer-program product includes a non-transitory computer-readable medium having instructions thereon. The instructions include code for causing a peer Bluetooth device to detect that mute is enabled at the peer Bluetooth device. The instructions also include code for causing the peer Bluetooth device to generate a mute remote microphone message to disable audio transmission functionality of the remote Bluetooth device. The instructions also include code for causing the peer Bluetooth device to send, by a Bluetooth controller of the peer Bluetooth device, the mute remote microphone message to the remote Bluetooth device.

An apparatus is also described. The apparatus includes means for detecting that mute is enabled at the peer Bluetooth device. The apparatus also includes means for generating a mute remote microphone message to disable audio transmission functionality of the remote Bluetooth device. The apparatus further includes means for sending, by a Bluetooth controller of the peer Bluetooth device, the mute remote microphone message to the remote Bluetooth device.

DETAILED DESCRIPTION

Bluetooth is a wireless communication technology that enables two Bluetooth-configured devices to communicate. A common scenario with Bluetooth devices is to transmit audio data between a first Bluetooth device and a second Bluetooth device. For example, the first Bluetooth device may be a desktop computer or a handset (e.g., smartphone) and the second Bluetooth device may be a headset, headphones or automobile hands-free audio system.

Mute is a common feature in communication devices. In one approach, when mute is enabled on a Bluetooth device, the Bluetooth device ceases audio-related transmissions. For example, upon enabling mute, a Bluetooth device may disable audio processing related to its microphone. While muted, the Bluetooth device may continue to receive and output audio.

However, in the context of Bluetooth communications, muting on a first Bluetooth device has not been extended to the second Bluetooth device. For example, a desktop computer may establish a communication channel with a remote device. When mute is selected on a user interface of the desktop computer, the desktop computer may stop sending audio data to the remote device. However, a Bluetooth headset wirelessly connected to the desktop computer continues to process audio data from its microphone and transmits the audio data to the desktop computer as if it were not muted.

The consequence of this is wasting a significant amount of power in the headset in this mode of operation. In normal conversational phone calls, mute may not be used much, but in conference calls, each person's communication device might be in mute most of the time. Therefore, a conference call is one use case in which systems and methods for muting of a remote Bluetooth device may be beneficial.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
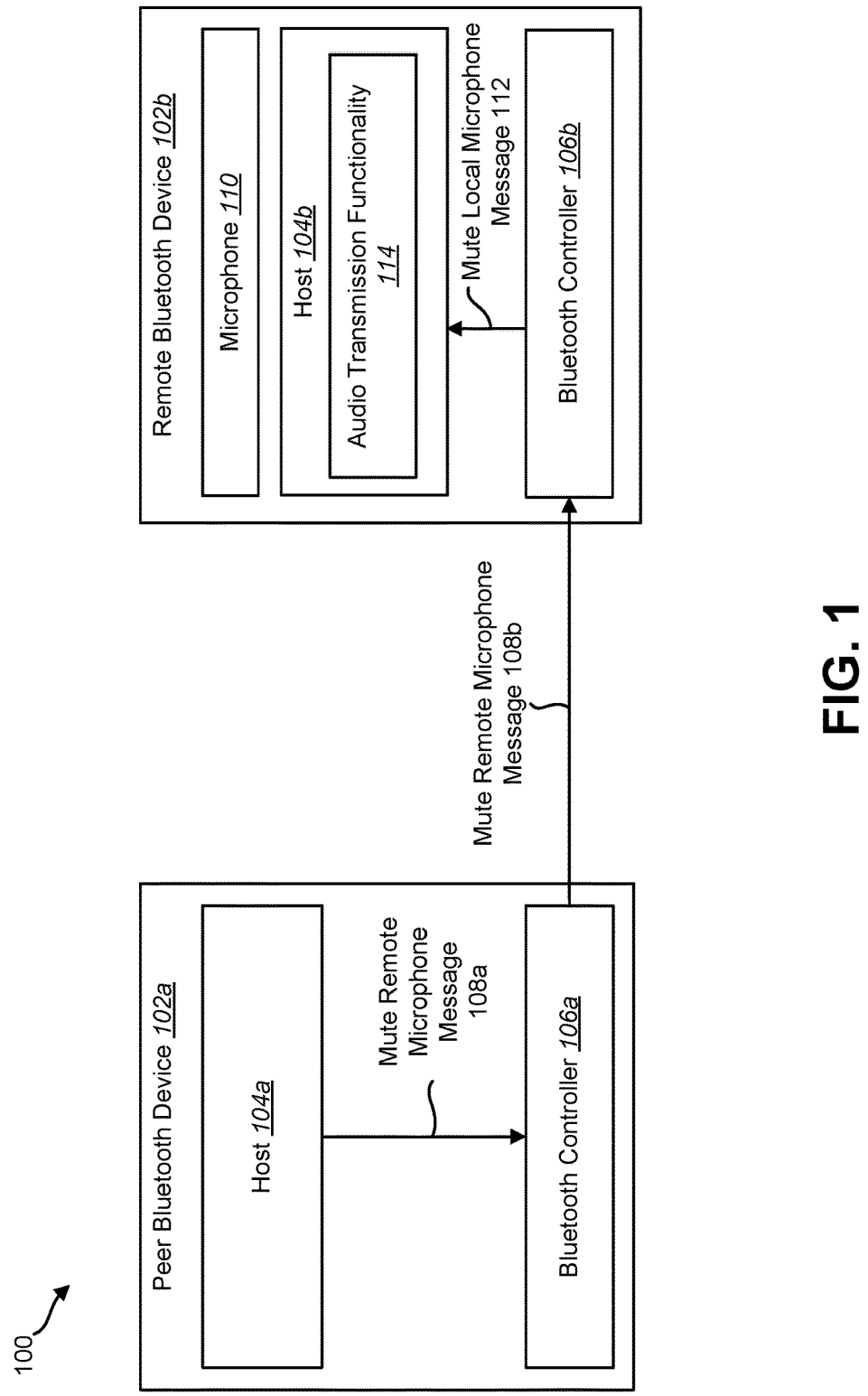
FIG. 1 is a block diagram illustrating one configuration of a wireless communication system in which muting of a remote Bluetooth device may be implemented.

FIG. 1 is a block diagram illustrating one configuration of a wireless communication system 100 in which muting of a remote Bluetooth device 102b may be implemented. The wireless system 100 may include a peer Bluetooth device 102a and a remote Bluetooth device 102b. Wireless communication systems 100 are widely deployed to provide various types of communication content such as voice, data, and so on.

Some wireless communication devices may utilize multiple communication technologies. For example, one communication technology may be utilized for mobile wireless system (MWS) (e.g., cellular) communications, while another communication technology may be utilized for wireless connectivity (WCN) communications. MWS may refer to larger wireless networks (e.g., wireless wide area networks (WWANs), cellular phone networks, Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc.). WCN may refer to relatively smaller wireless networks (e.g., wireless local area networks (WLANs), wireless personal area networks (WPANs), IEEE 802.11 (Wi-Fi) networks, Bluetooth (BT) networks, wireless Universal Serial Bus (USB) networks, etc.).

Communications in a wireless communication system 100 (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system.

The MIMO system can provide improved performance (e.g., higher throughput, greater capacity or improved reliability) if the additional dimensionalities created by the multiple transmit and receive antennas are utilized.

A Bluetooth device 102 is an electrical device that is configured to communicate using Bluetooth protocols. A Bluetooth device 102 may also be referred to as a wireless communication device, a wireless device, a mobile device, mobile station, subscriber station, client, client station, user equipment (UE), remote station, access terminal, mobile terminal, terminal, user terminal, subscriber unit, etc. Examples of Bluetooth devices 102 include laptop or desktop computers, cellular phones, smartphones, wireless modems, e-readers, tablet devices, gaming systems, keyboards, keypads, computer mice, remote controllers, headsets, headphones, automobile hands-free audio system, etc.

A Bluetooth device 102 may be configured to establish links with one or more target devices that have Bluetooth transceivers. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets and each packet is transmitted on a designated Bluetooth frequency (e.g., channel).

Communications in a Bluetooth network may be achieved based on a master polled system. The master polled system may utilize time-division duplexing (TDD) in which a Bluetooth device 102 may send a packet to a target device 104. For example, the Bluetooth device 102 may send a packet to the target device 104 during pairing or during a connection request. In one implementation, the Bluetooth device 102 may be a master device and the target device 104 may be a slave device. In a master polled system, the Bluetooth device 102 sending the packet gives the slave wireless device the ability to transmit back.

The Bluetooth wireless communication standard is typically employed for exchanging communications between fixed or mobile Bluetooth-enabled devices over short distances. In some configurations, the systems and methods disclosed herein may be applied to Bluetooth Low Energy (BLE) devices. LE refers to the "Low Energy" extension of the Bluetooth standard. The BLE extension is focused on energy-constrained applications such as battery-operated devices, sensor applications, etc. The BLE extension may also be referred to as Bluetooth Smart.

The following description uses terminology associated with the Bluetooth and Bluetooth LE standards. Nevertheless, the concepts may be applicable to other technologies and standards that involve modulating and transmitting digital data. Accordingly, while some of the description is provided in terms of Bluetooth standards, the systems and methods disclosed herein may be implemented more generally in wireless communication devices that may not conform to Bluetooth standards.

A Bluetooth device 102 may include a host 104 and a Bluetooth controller 106. The host 104 may implement computing operations on the Bluetooth device 102. For example, the host 104 may implement an operating system (OS). The host 104 may also implement one or more additional applications or programs related to the operation of the Bluetooth device 102. The host 104 may interface with one or more subsystems of the Bluetooth device 102.

A Bluetooth device 102 may also include a Bluetooth controller 106. A Bluetooth controller 106 may interface with the host 104 of the Bluetooth device 102. The Bluetooth controller 106 may communicate with other target Bluetooth devices 102. The Bluetooth controller 106 may include a Bluetooth transceiver that establishes a radio link with a target Bluetooth device 102 using one or more of a link layer control procedure, a link manager protocol, or a Qualcomm link layer (QLL) procedure.

In some scenarios, a Bluetooth device 102 may be configured to send and receive audio data. For example, a peer Bluetooth device 102a may be a desktop computer, a handset (e.g., smartphone) or a conference call system. The peer Bluetooth device 102a may establish a link to one or more communication devices for audio communication. This may also include an audio component of video communication. For example, the peer Bluetooth device 102a may establish a voice call or video call with another communication device. In another example, the peer Bluetooth device 102a may connect to a web-hosted service for a conference call.

The peer Bluetooth device 102a may be connected to a remote Bluetooth device 102b with which the peer Bluetooth device 102a may communicate audio data. For example, the remote Bluetooth device 102b may include a microphone 110. Examples of a remote Bluetooth device 102b include a headset, headphones, or a hands-free audio system (used in an automobile, for instance). The peer Bluetooth device 102a may send audio data to the remote Bluetooth device 102b via a Bluetooth link. The remote Bluetooth device 102b may also send audio data to the peer Bluetooth device 102a via a Bluetooth link.

In some scenarios, it is beneficial to mute the sound sent from a Bluetooth device 102. For example, in a conference call scenario, many users may connect to the conference call, but only a few of the users may speak at any given moment. The non-speaking users may want to hear the audio of the conference call, but may want to mute the microphones 110 on their end to prevent any irrelevant sounds from the conference call. Therefore, during a conference call, a peer Bluetooth device 102a may be muted a significant amount of time.

In Bluetooth communication, muting on a peer Bluetooth device 102a (e.g., handset) has not been extended to a connected remote Bluetooth device 102b (e.g., headset). Therefore, even though audio transmissions (from the peer Bluetooth device 102a to another communication device) are not sent from the peer Bluetooth device 102a when it is muted, the remote Bluetooth device 102b may continue to process audio data from its microphone 110 and transmit the audio data to the peer Bluetooth device 102a as if it were not muted. In other words, the remote Bluetooth device 102b may not be aware that the peer Bluetooth device 102a is muted and the remote Bluetooth device 102b may continue normal audio transmissions.

The consequence of this mode of operation is that the remote Bluetooth device 102b wastes power. Audio transmission functionality 114 may require a significant amount of power. Audio transmission functionality 114 may include one or more of the following processes: microphone path codec processing, microphone path audio operations (e.g., echo cancellation), voice activity detection, comfort noise generation and audio-related wireless transmissions.

To address this problem, the systems and methods described herein provide for muting of a remote Bluetooth device 102b by a peer Bluetooth device 102a. The peer Bluetooth device 102a may send a mute remote microphone message 108b to the remote Bluetooth device 102b using a Bluetooth link. Upon receiving the mute remote microphone message 108b, the remote Bluetooth device 102b may disable audio transmission functionality 114.

In an implementation, the host 104a of the peer Bluetooth device 102a may determine that mute is enabled. Mute may be selected in a user interface. For example, mute may be selected by pressing a mute button on a user interface of the peer Bluetooth device 102a.

When mute is enabled, the host 104a may send a mute remote microphone message 108a to the Bluetooth controller 106a. The Bluetooth controller 106a may format the mute remote microphone message 108a as a Bluetooth protocol message. The Bluetooth controller 106a may send the formatted mute remote microphone message 108b to the remote Bluetooth device 102b. The Bluetooth controller 106a may send the mute remote microphone message 108b using a link layer control procedure, a link manager protocol, or a Qualcomm link layer (QLL) procedure.

In an implementation, a new Link Manager Protocol (LMP) message 108b may be created. This LMP message 108b may be sent from the Bluetooth controller 106a of the peer Bluetooth device 102a to the Bluetooth controller 106b of the remote Bluetooth device 102b. This message 108b may include a single bit. When the bit has a value of 0 (i.e., Mute_Bit=0), the remote Bluetooth device 102b is not muted. When the bit has a value of 1 (i.e., Mute_Bit=1), the remote Bluetooth device 102b is muted. It should be noted that other ways of encoding the mute remote microphone message 108b could be done, for example using separate opcodes.

A similar procedure may be done using a link layer control procedure or a QLL procedure. The procedure may be identical as the LMP implementation described above (e.g., sending a mute remote microphone message 108b from the peer Bluetooth Device 102a (after the user has pressed the mute button) to the remote Bluetooth device 102b).

It should be noted, that the mute remote microphone message 108b may be generated in situations other than being triggered by a user. For example, a peer Bluetooth device 102a may generate a mute remote microphone message 108b automatically. This may be done by a conference system (e.g., conference system software may automatically mute people on their entry), or it could be done by a conference host (via a central server).

A Bluetooth controller 106b of the remote Bluetooth device 102b may receive the mute remote microphone message 108b. The Bluetooth controller 106b may generate a mute local microphone message 112, which is provided to the host 104b of the remote Bluetooth device 102b.

Upon receiving the mute local microphone message 112, the host 104b may disable audio transmission functionality 114 related to the microphone 110. For example, the host 104b may disable the microphone path codec processing, microphone path audio operations (e.g., echo cancellation), voice activity detection, comfort noise generation or audio-related wireless transmissions.

The peer Bluetooth device 102a may also disable mute on the remote Bluetooth device 102b. The peer Bluetooth device 102a may send a disable remote mute message to the remote Bluetooth device 102b. In an implementation, the Bluetooth controller 106a may send the disable remote mute message using a link layer control procedure, a link manager protocol, or a QLL procedure.

Upon receiving the disable remote mute message, the remote Bluetooth device 102b may enable audio transmission functionality 114. This may include enabling the microphone path codec processing, microphone path audio operations (e.g., echo cancellation), voice activity detection, comfort noise generation or audio-related wireless transmissions.

In an implementation, the remote Bluetooth device 102b may override the mute command received from the peer Bluetooth device 102a. For example, the remote Bluetooth device 102b may be configured with a user interface (e.g., button, switch, etc.) that enables or disables mute. Upon selecting to mute the remote Bluetooth device 102b via its user interface, the remote Bluetooth device 102b may disable audio transmission functionality 114 as described above. If the remote Bluetooth device 102b is muted by the peer Bluetooth device 102a, a user may select to override this command by selecting to enable audio transmission functionality 114 at the user interface of the remote Bluetooth device 102b.

The described systems and methods may reduce power consumption of a remote Bluetooth device 102b when it is connected to a peer Bluetooth device 102a. This may increase battery life of a battery-powered remote Bluetooth device 102b (e.g., headset), which may improve user experience. For example, this may allow a user to use the remote Bluetooth device 102b for a longer period of time.

Figure 2:
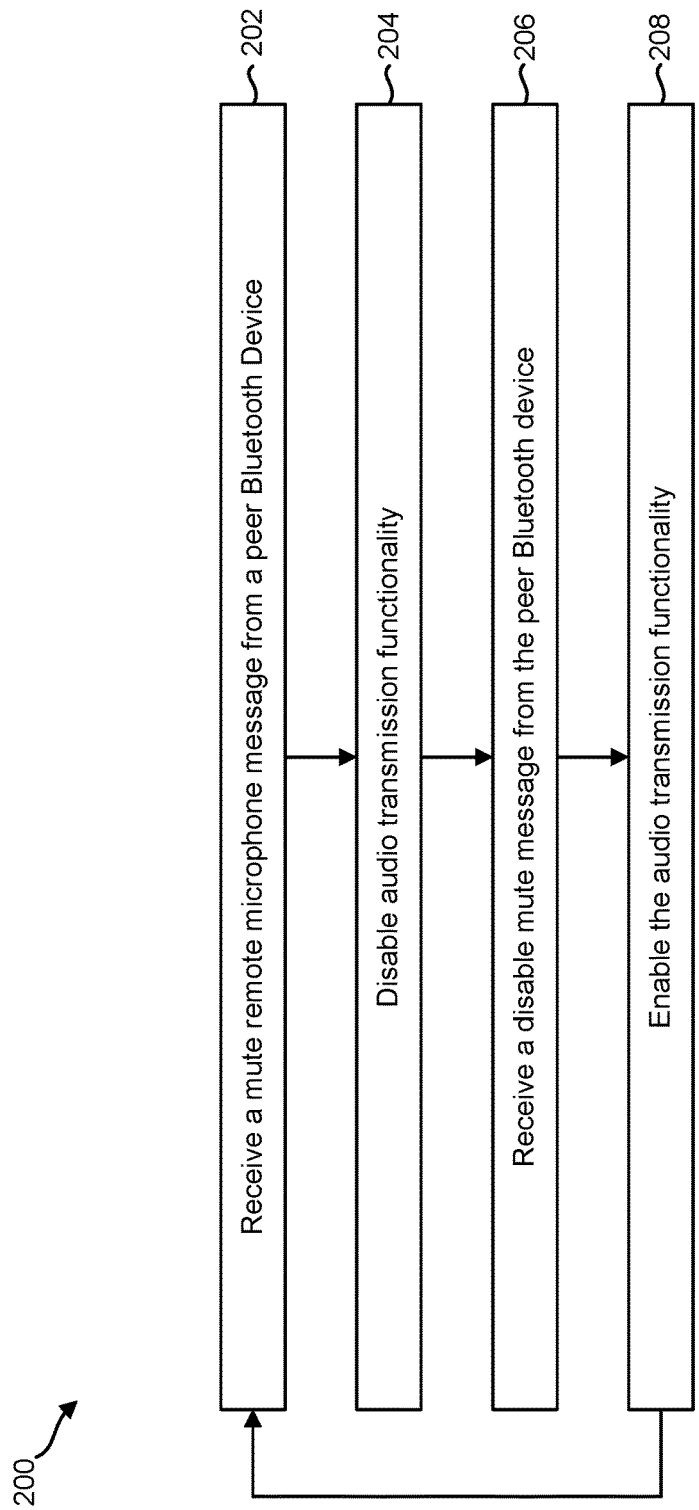
FIG. 2 is a flow diagram illustrating a configuration of a method for muting a remote Bluetooth device.

FIG. 2 is a flow diagram illustrating a configuration of a method 200 for muting a remote Bluetooth device 102b. This method 200 may be implemented by a remote Bluetooth device 102b that is connected to a peer Bluetooth device 102a via a wireless Bluetooth link. In an implementation, the remote Bluetooth device 102b may be a headset that is connected to the peer Bluetooth device 102a.

The remote Bluetooth device 102b may receive 202 a mute remote microphone message 108b from the peer Bluetooth device 102a. For example, a Bluetooth controller 106b may receive 202 the mute remote microphone message 108b via a link layer control procedure, a link manager protocol, or a QLL procedure. Upon receiving 202 the mute remote microphone message 108b, the Bluetooth controller 106b may provide a mute local microphone message 112 to the host 104b of the remote Bluetooth device 102b.

The remote Bluetooth device 102b may disable 204 audio transmission functionality 114. For example, the remote Bluetooth device 102b may disable 204 microphone path codec processing, microphone path audio operations (e.g., echo cancellation), voice activity detection, comfort noise generation or audio-related wireless transmissions.

The remote Bluetooth device 102b may receive 206 a disable remote mute message from the peer Bluetooth device 102a. The disable remote mute message may be received 206 by the Bluetooth controller 106b. Upon receiving 206 the disable remote mute message, the remote Bluetooth device 102b may enable 208 its audio transmission functionality 114. The remote Bluetooth device 102b may resume audio-related wireless transmissions to the peer Bluetooth device 102a.

Figure 3:
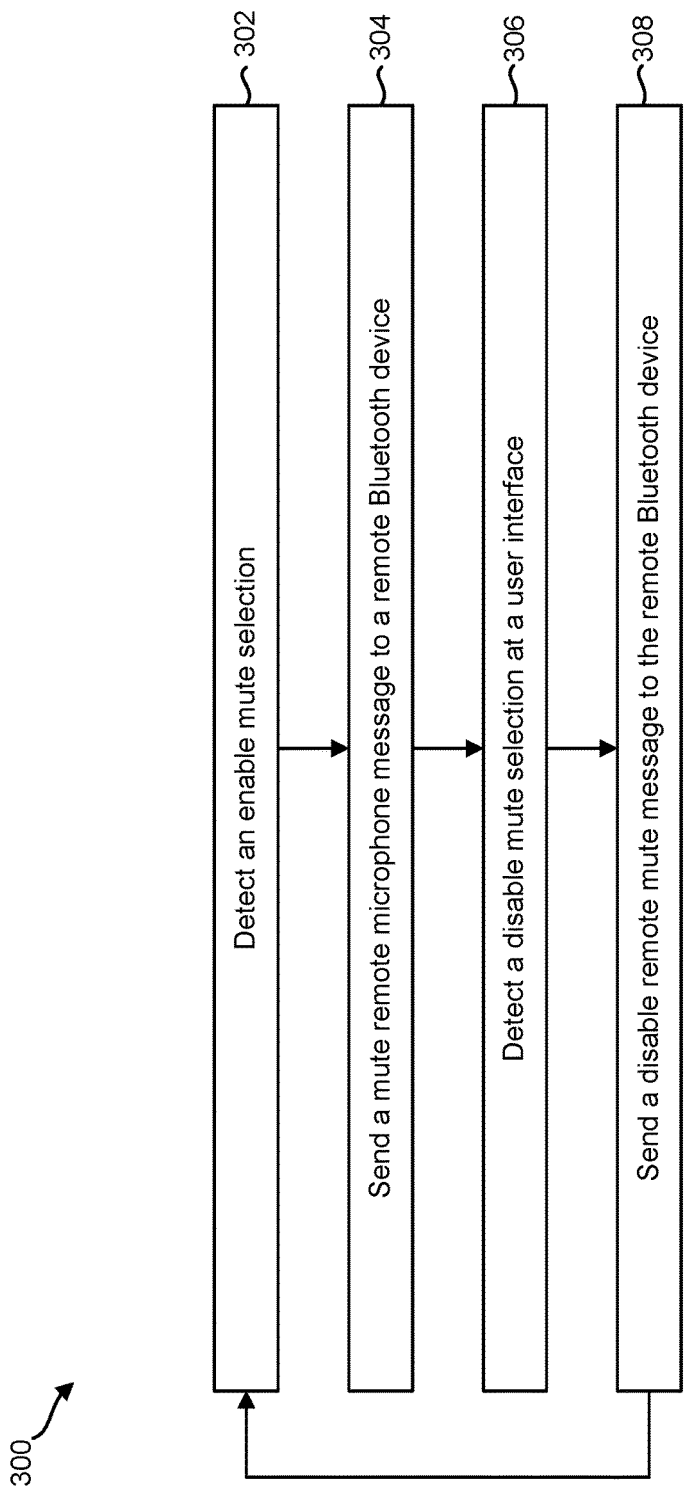
FIG. 3 is a flow diagram illustrating another configuration of a method for muting a remote Bluetooth device.

FIG. 3 is a flow diagram illustrating another configuration of a method 300 for muting a remote Bluetooth device 102b. This method 300 may be implemented by a peer Bluetooth device 102a that is connected to a remote Bluetooth device 102b via a wireless Bluetooth link. In an implementation, the remote Bluetooth device 102b may be a headset that is connected to the peer Bluetooth device 102a.

The peer Bluetooth device 102a may detect 302 an enable mute selection. For example, the peer Bluetooth device 102a may include a user interface with a user-selectable control to enable mute. The user-selectable control may be a physical button or a graphical user interface element. Upon detecting 302 that mute is enabled, the peer Bluetooth device 102a may determine that audio functionality is being performed by a remote Bluetooth device 102b.

Alternatively, the peer Bluetooth device 102a may automatically enable mute. For example, a conference call system may automatically enable mute when the peer Bluetooth device 102a joins a conference call.

The peer Bluetooth device 102a may send 304 a mute remote microphone message 108b to the remote Bluetooth device 102b. For example, a host 104a of the peer Bluetooth device 102a may send a mute remote microphone message 108a to a Bluetooth controller 106a of the peer Bluetooth device 102a. The Bluetooth controller 106a may send 304 a Bluetooth-formatted mute remote microphone message 108b via a link layer control procedure, a link manager protocol, or a QLL procedure to the remote Bluetooth device 102b. The mute remote microphone message 108b may instruct the remote Bluetooth device 102b to disable audio transmission functionality 114.

The peer Bluetooth device 102a may detect 306 a disable mute selection at the user interface. For example, at some point a user may choose to disable mute and re-enable audio functionality.

The peer Bluetooth device 102a may send 308 a disable remote mute message to the remote Bluetooth device 102b. For example, the host 104a of the peer Bluetooth device 102a may send a disable remote mute message to the Bluetooth controller 106a of the peer Bluetooth device 102a. The Bluetooth controller 106a may send 308 a Bluetooth-formatted disable remote mute message via a link layer control procedure, a link manager protocol, or a QLL procedure to the remote Bluetooth device 102b. The disable remote mute message may instruct the remote Bluetooth device 102b to enable audio transmission functionality 114.

Figure 4:
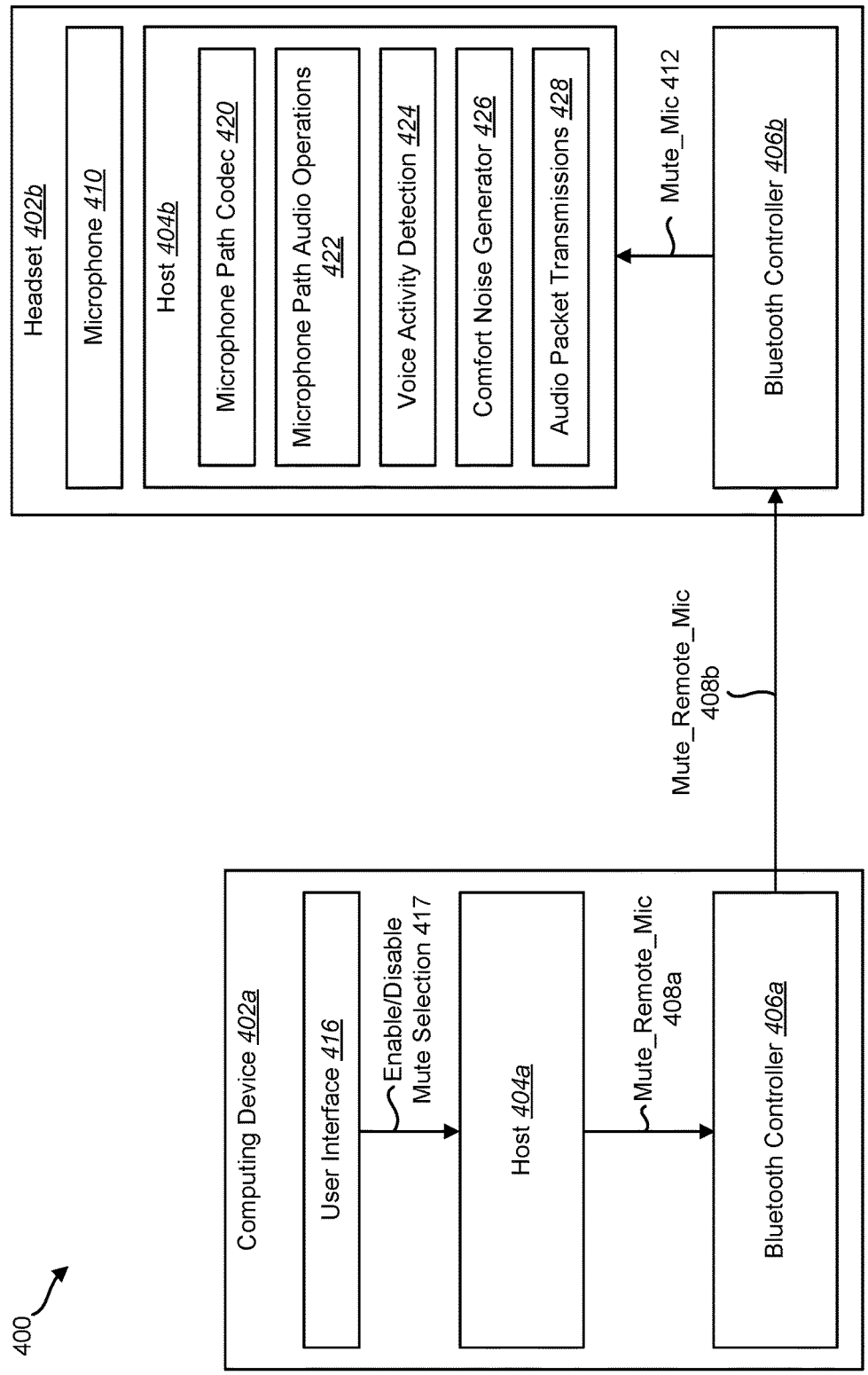
FIG. 4 is a block diagram illustrating muting of a remote headset by a computing device.

FIG. 4 is a block diagram illustrating a system 400 for muting of a remote headset 402b by a computing device 402a. The computing device 402a may be implemented in accordance with the peer Bluetooth device 102a described in connection with FIG. 1. The headset 402b may be implemented in accordance with the remote Bluetooth device 102b described in connection with FIG. 1.

The computing device 402a may be configured with a host 404a and a Bluetooth controller 406a. Examples of the computing device 402a include a desktop computer, laptop computer, tablet computer, handset (e.g., cellular phone, smartphone), gaming console and portable gaming system.

The host 404a of the computing device 402a may be configured to interact with a user interface 416. In an implementation, the user interface 416 may be a graphical user interface. In another implementation, the user interface 416 may be a physical control (e.g., button, switch, etc.). The user interface 416 may include one or more user-selectable controls for enabling and disabling mute. The user interface 416 may provide an enable/disable mute selection 417 indicating whether mute is enabled or disabled.

Upon detecting an enable mute selection 417 from the user interface 416, the host 404a may determine that audio functionality is being provided by the headset 402b. The host 404a may generate a Mute_Remote_Mic message 408a. The Mute_Remote_Mic message 408a may command the headset 402b to disable audio transmission functionality 114.

In an implementation, the Mute_Remote_Mic message 408a may include an enable mute field. When the value of the enable mute field is set to 1, this indicates that mute is to be enabled by the headset 402b. When the value of the enable mute field is set to 0, this indicates that mute is to be disabled by the headset 402b.

The host 404a may send the Mute_Remote_Mic message 408a to the Bluetooth controller 406a. The Bluetooth controller 406a may format the Mute_Remote_Mic message 408a for Bluetooth transmission according to one of a link layer control procedure, link manager protocol or QLL procedure. The Bluetooth controller 406a may send a Mute_Remote_Mic message 408b to the Bluetooth controller 406b of the headset 402b.

Upon receiving the Mute_Remote_Mic message 408b, the Bluetooth controller 406b may generate a Mute_Mic message 412. The Mute_Mic message 412 may be a mute local microphone message 412. The Mute_Mic message 412 may be formatted for the host 404b of the headset 402b. The Mute_Mic message 412 may indicate whether the host 404b should enable or disable mute.

In an implementation, the Mute_Mic message 412 may also include an enable mute field. When the value of the enable mute field is set to 1, this indicates that mute is to be enabled by the host 404b. When the value of the enable mute field is set to 0, this indicates that mute is to be disabled by the host 404b.

Upon receiving the Mute_Mic message 412, the host 404b may disable one or more aspects of audio transmission functionality 114. The host 404b may disable the microphone path codec 420 that converts analog audio signals received from the microphone 410 into digital signals. The host 404b may disable one or more microphone path audio operations 422. These operations 422 may include echo cancellation for the audio signal received from the microphone 410.

The host 404b may also disable voice activity detection 424. In an implementation, the headset 402b may be configured to disable audio transmissions during silent periods (e.g., when a user is not speaking). This may be a feature of discontinuous transmission (DTX) operation. However, the headset 402b may perform voice activity detection 424 to determine when a user is speaking, at which point the headset 402b re-enables audio transmission. However, when the headset 402b is muted, voice activity detection 424 is not necessary because no audio will be transmitted by the computing device 402a. Therefore, to conserve energy, voice activity detection 424 may be disabled during mute.

The host 404b may also disable a comfort noise generator 426. The comfort noise generator 426 may generate comfort noise packets. For example, when the headset 402b is performing DTX, the headset 402b may transmit comfort noise packets to the computing device 402a at the beginning of a silent period. The comfort noise may simulate background sound. During DTX operation, the comfort noise may be updated periodically. However, when the headset 402b is muted, the comfort noise generator 426 is not necessary because the comfort noise will not be transmitted by the computing device 402a. Therefore, to conserve energy, the comfort noise generator 426 may be disabled during mute.

The host 404b may disable other audio packet transmissions 428. This may include normal audio packets and silence frames that would be transmitted to the computing device 402a.

At some point, mute may be disabled at the computing device 402a. For example, a disable mute selection 417 may be made at the user interface 416 of the computing device 402a. The host 404a may detect the disable mute selection 417 and generate a disable remote mute message.

In an implementation, the disable remote mute message may be communicated using the Mute_Remote_Mic message 408a with the enable mute field set to 0. The Bluetooth controller 406*a* may send the disable remote mute message (e.g., the Mute_Remote_Mic message 408*b* with the enable mute field set to 0) to the Bluetooth controller 406*b* of the headset 402*b* using a link layer control procedure, link manager protocol or QLL procedure.

The Bluetooth controller 406*b* of the headset 402*b* may send a disable local mute message (e.g., Mute_Mic message 412 with the enable mute field set to 0) to the host 404*b*. Upon receiving the disable local mute message, the host 404*b* may re-enable the audio transmission functionality 114. This may include re-enabling one or more of the microphone path codec 420, the microphone path audio operations 422, the voice activity detection 424, the comfort noise generator 426 and the audio packet transmissions 428.

Figure 5:
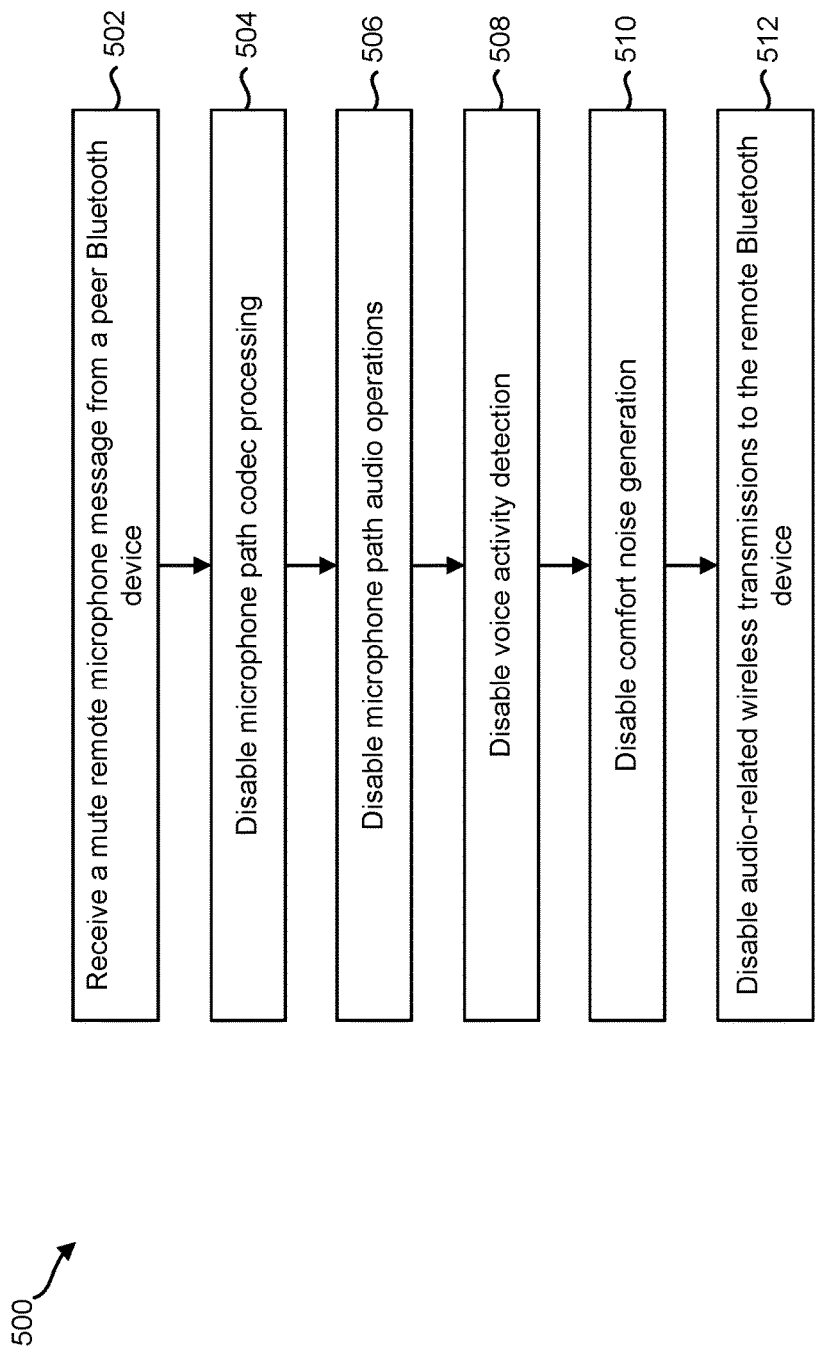
FIG. 5 is a flow diagram illustrating another configuration of a method for muting a remote Bluetooth device.

FIG. 5 is a flow diagram illustrating another configuration of a method 500 for muting a remote Bluetooth device 102*b*. This method 200 may be implemented by a remote Bluetooth device 102*b* that is connected to a peer Bluetooth device 102*a* via a wireless Bluetooth link. In an implementation, the remote Bluetooth device 102*b* may be a headset 402*b* that is connected to computing device 402*a*.

The remote Bluetooth device 102*b* may receive 502 a mute remote microphone message 108*b* from the peer Bluetooth device 102*a*. The remote Bluetooth device 102*b* may receive 502 the mute remote microphone message 108*b* from the peer Bluetooth device 102*a* when mute is enabled at a user interface 416 of the peer Bluetooth device 102*a*.

In an implementation, the mute remote microphone message 108*b* may be a Mute_Remote_Mic message 408*b* with an enable mute field set to 1. A Bluetooth controller 106*b* may receive the mute remote microphone message 108*b*. The Bluetooth controller 106*b* may generate a mute local microphone message 112 (e.g., Mute_Mic message 412 with an enable mute field set to 1). The Bluetooth controller 106*b* may send the mute local microphone message 112 to the host 104*b* of the remote Bluetooth device 102*b*.

Upon receiving the mute remote microphone message 108*b*, the remote Bluetooth device 102*b* may disable 504 microphone path codec 420 processing. The remote Bluetooth device 102*b* may also disable 506 microphone path audio operations 422 (e.g., echo cancelation).

The remote Bluetooth device 102*b* may further disable 508 voice activity detection 424. The remote Bluetooth device 102*b* may also disable 510 comfort noise generation. The remote Bluetooth device 102*b* may disable 512 audio-related wireless transmissions to the peer Bluetooth device 102*a*.

Figure 6:
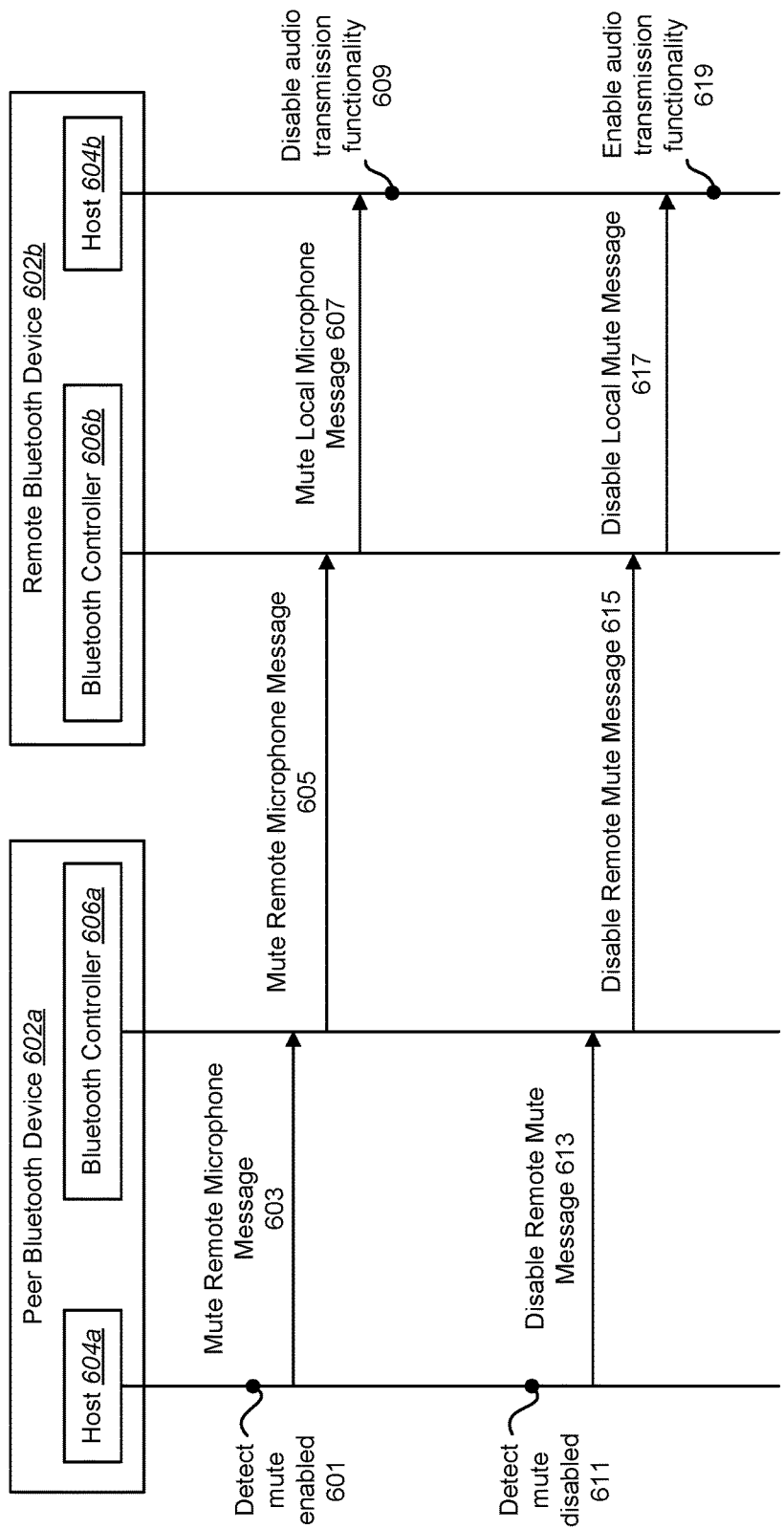
FIG. 6 is a sequence diagram illustrating muting a remote Bluetooth device by a peer Bluetooth device.

FIG. 6 is a sequence diagram illustrating muting a remote Bluetooth device 602*b* by a peer Bluetooth device 602*a*. The peer Bluetooth device 602*a* may include a host 604*a* and a Bluetooth controller 606*a*. The remote Bluetooth device 602*b* may also include a host 604*b* and a Bluetooth controller 606*b*.

The host 604*a* may detect 601 that mute is enabled. For example, the host 604*a* may detect 601 an enable mute selection 417 at a user interface 416 of the peer Bluetooth device 602*a*. The host 604*a* may send 603 a mute remote microphone message 108*b* to the Bluetooth controller 606*a*.

The Bluetooth controller 606*a* may send 605 the mute remote microphone message 108*b* to the Bluetooth controller 606*b* of the remote Bluetooth device 602*b*. In an implementation, the Bluetooth controller 606*b* may use a link layer control procedure, link manager protocol or QLL procedure to send 605 the mute remote microphone message 108*b*.

The Bluetooth controller 606*b* may send 607 a mute local microphone message 112 to the host 604*b* of the remote Bluetooth device 602*b*. Upon receiving the mute local microphone message 112, the host 604*b* may disable 609 audio transmission functionality 114.

At a later time, the host 604*a* of the peer Bluetooth device 602*a* may detect 611 that mute is disabled. For example, the host 604*a* may detect 611 a disable mute selection 417 at a user interface 416 of the peer Bluetooth device 602*a*. The host 604*a* may send 613 a disable remote mute message to the Bluetooth controller 606*a*.

The Bluetooth controller 606*a* may send 615 the disable remote mute message to the Bluetooth controller 606*b* of the remote Bluetooth device 602*b*. In an implementation, the Bluetooth controller 606*b* may use a link layer control procedure, link manager protocol or QLL procedure to send 615 the disable remote mute message.

The Bluetooth controller 606*b* may send 617 a disable local mute message to the host 604*b* of the remote Bluetooth device 602*b*. Upon receiving the disable local mute message, the host 604*b* may enable 619 audio transmission functionality 114.

Figure 7:
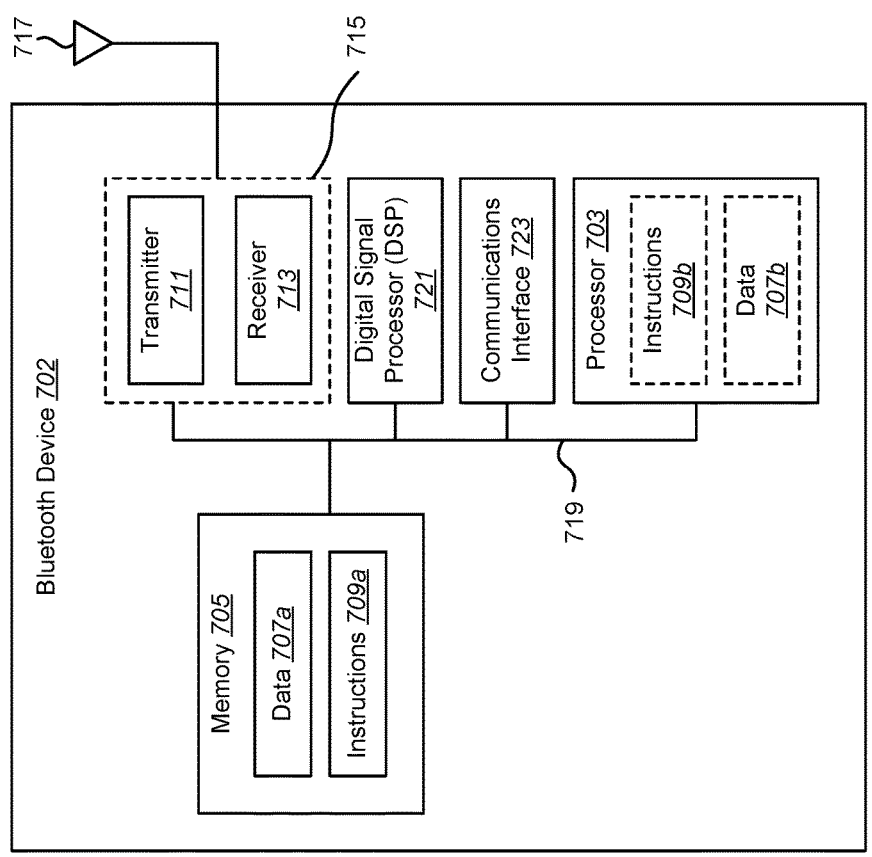
FIG. 7 illustrates certain components that may be included within a Bluetooth device.

FIG. 7 illustrates certain components that may be included within a Bluetooth device 702. The Bluetooth device 702 may be a wireless device, an access terminal, a mobile station, a user equipment (UE), a laptop computer, a desktop computer, a tablet computer, a wireless headset, etc. For example, the Bluetooth device 702 may be a peer Bluetooth device 102*a* or a remote Bluetooth device 102*b* of FIG. 1.

The Bluetooth device 702 includes a processor 703. The processor 703 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 703 may be referred to as a central processing unit (CPU). Although just a single processor 703 is shown in the Bluetooth device 702 of FIG. 7, in an alternative configuration, a combination of processors (e.g., an ARM and DSP) could be used.

The Bluetooth device 702 also includes memory 705 in electronic communication with the processor (i.e., the processor can read information from and/or write information to the memory). The memory 705 may be any electronic component capable of storing electronic information. The memory 705 may be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 707*a* and instructions 709*a* may be stored in the memory 705. The instructions may include one or more programs, routines, sub-routines, functions, procedures, code, etc. The instructions may include a single computer-readable statement or many computer-readable statements. The instructions 709*a* may be executable by the processor 703 to implement the methods disclosed herein. Executing the instructions 709*a* may involve the use of the data 707*a* that is stored in the memory 705. When the processor 703 executes the instructions 709, various portions of the instructions 709*b* may be loaded onto the processor 703, and various pieces of data 707*b* may be loaded onto the processor 703.

The Bluetooth device 702 may also include a transmitter 711 and a receiver 713 to allow transmission and reception of signals to and from the Bluetooth device 702 via one or more antennas 717. The transmitter 711 and receiver 713 may be collectively referred to as a transceiver 715. The Bluetooth device 702 may also include (not shown) multiple transmitters, multiple antennas, multiple receivers and/or multiple transceivers.

The Bluetooth device 702 may include a digital signal processor (DSP) 721. The Bluetooth device 702 may also include a communications interface 723. The communications interface 723 may allow a user to interact with the Bluetooth device 702.

The various components of the Bluetooth device 702 may be coupled together by one or more buses, which may include a power bus, a control signal bus, a status signal bus, a data bus, etc. For the sake of clarity, the various buses are illustrated in FIG. 7 as a bus system 719.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as illustrated by FIGS. 2-3 and FIG. 5, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for muting a Bluetooth device, comprising:
receiving, by a Bluetooth controller, a mute remote microphone message from a peer Bluetooth device, wherein the mute remote microphone message comprises an enable mute field with a single bit that indicates mute is to be enabled by the Bluetooth device when the enable mute field is set to 1; and
disabling audio transmission functionality of the Bluetooth device in response to receiving the mute remote microphone message, wherein disabling audio transmission functionality of the Bluetooth device comprises disabling comfort noise generation, disabling voice activity detection, disabling microphone path codec processing of the Bluetooth device and disabling audio-related wireless transmissions from the Bluetooth device to the peer Bluetooth device.

2. The method of claim 1, wherein the Bluetooth device is a headset, headphones or automobile hands-free audio system.

3. The method of claim 1, further comprising:
receiving a disable remote mute message from the peer Bluetooth device; and
enabling the audio transmission functionality of the Bluetooth device.

4. The method of claim 1, further comprising:
generating, at the Bluetooth controller, a mute local microphone message in response to receiving the mute remote microphone message; and
sending the mute local microphone message from the Bluetooth controller to a host of the Bluetooth device, wherein the host disables the audio transmission functionality in response to the mute local microphone message.

5. The method of claim 1, wherein the mute remote microphone message is communicated from the peer Bluetooth device to the Bluetooth device via one of a link layer control procedure, link manager protocol or Qualcomm link layer (QLL) procedure.

6. The method of claim 1, wherein the Bluetooth device receives the mute remote microphone message from the peer Bluetooth device when mute is enabled at a user interface of the peer Bluetooth device.

7. A Bluetooth device, comprising:
a processor;
a memory in communication with the processor; and
instructions stored in the memory, the instructions executable by the processor to:
receive, by a Bluetooth controller, a mute remote microphone message from a peer Bluetooth device, wherein the mute remote microphone message comprises an enable mute field that indicates mute is to be enabled by the Bluetooth device when the enable mute field is set to 1; and
disable audio transmission functionality of the Bluetooth device in response to receiving the mute remote microphone message, wherein the instructions executable to disable audio transmission functionality of the Bluetooth device comprise instructions executable to disable comfort noise generation, disable voice activity detection, disable microphone path codec processing of the Bluetooth device and disable audio-related wireless transmissions from the Bluetooth device to the peer Bluetooth device.

8. The Bluetooth device of claim 7, wherein the Bluetooth device is a headset, headphones or automobile hands-free audio system.

9. The Bluetooth device of claim 7, further comprising instructions executable to:
receive a disable remote mute message from the peer Bluetooth device; and
enable the audio transmission functionality of the Bluetooth device.

10. The Bluetooth device of claim 7, further comprising instructions executable to:
generate, at the Bluetooth controller, a mute local microphone message in response to receiving the mute remote microphone message; and
send the mute local microphone message from the Bluetooth controller to a host of the Bluetooth device, wherein the host disables the audio transmission functionality in response to the mute local microphone message.

11. The Bluetooth device of claim 7, wherein the mute remote microphone message is communicated from the peer Bluetooth device to the Bluetooth device via one of a link layer control procedure, link manager protocol or Qualcomm link layer (QLL) procedure.

12. The Bluetooth device of claim 7, wherein the Bluetooth device receives the mute remote microphone message from the peer Bluetooth device when mute is enabled at a user interface of the peer Bluetooth device.

13. A method for muting a remote Bluetooth device by a peer Bluetooth device, comprising:
detecting that mute is enabled at the peer Bluetooth device;
generating a mute remote microphone message to disable audio transmission functionality of the remote Bluetooth device, wherein the mute remote microphone message comprises an enable mute field that indicates mute is to be enabled by the remote Bluetooth device when the enable mute field is set to 1; and
sending, by a Bluetooth controller of the peer Bluetooth device, the mute remote microphone message to the remote Bluetooth device, wherein the remote Bluetooth device disables comfort noise generation, disables voice activity detection, disables microphone path codec processing and disables audio-related wireless transmissions to the peer Bluetooth device upon receiving the mute remote microphone message.

14. The method of claim 13, wherein the remote Bluetooth device is a headset, headphones or automobile hands-free audio system.

15. The method of claim 13, further comprising:
detecting that mute is disabled at a user interface of the peer Bluetooth device;
generating a disable remote mute message; and
sending, by the Bluetooth controller of the peer Bluetooth device, the disable remote mute message to the remote Bluetooth device.

16. The method of claim 13, wherein the mute remote microphone message is communicated from the peer Bluetooth device to the remote Bluetooth device via one of a link layer control procedure, link manager protocol or Qualcomm link layer (QLL) procedure.

17. A peer Bluetooth device, comprising:
a processor;
a memory in communication with the processor; and
instructions stored in the memory, the instructions executable by the processor to:
detect that mute is enabled at the peer Bluetooth device;
generate a mute remote microphone message to disable audio transmission functionality of a remote Bluetooth device, wherein the mute remote microphone message comprises an enable mute field that indicates mute is to be enabled by the remote Bluetooth device when the enable mute field is set to 1; and send, by a Bluetooth controller of the peer Bluetooth device, the mute remote microphone message to the remote Bluetooth device, wherein the remote Bluetooth device disables comfort noise generation, disables voice activity detection, disables microphone path codec processing and disables audio-related wireless transmissions to the peer Bluetooth device upon receiving the mute remote microphone message.

18. The peer Bluetooth device of claim 17, further comprising instructions executable to:

detect that mute is disabled at a user interface of the peer Bluetooth device;

generate a disable remote mute message to enable audio transmission functionality of the remote Bluetooth device; and send, by the Bluetooth controller of the peer Bluetooth device, the disable remote mute message to the remote Bluetooth device.

\* \* \* \* \*